March 28, 1933.  F. D. FISHER  1,903,103
ADVERTISING DEVICE

Filed May 21, 1932

Inventor:
Fred D. Fisher

Patented Mar. 28, 1933

1,903,103

UNITED STATES PATENT OFFICE

FRED D. FISHER, OF CHICAGO, ILLINOIS, ASSIGNOR TO SCIENTIFIC BRAKE SERVICE LABORATORIES, INC., OF CHICAGO, ILLINOIS, A CORPORATION OF DELAWARE

ADVERTISING DEVICE

Application filed May 21, 1932. Serial No. 612,736.

It is a primary object of this invention to provide an advertising device which will call attention to the use of a testing machine, with particular reference to a machine for testing simultaneously but individually the brakes on the four wheels of an automobile. The testing mechanism, which is old and forms no part of the present invention, has four dials which oscillate equally when the brakes are all set so as to have equal braking action.

Figure 1:
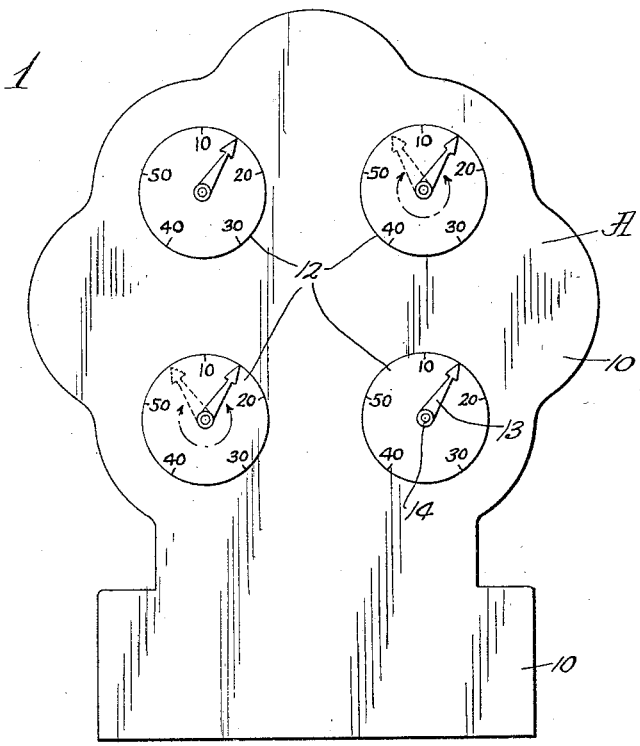
Figure 2:
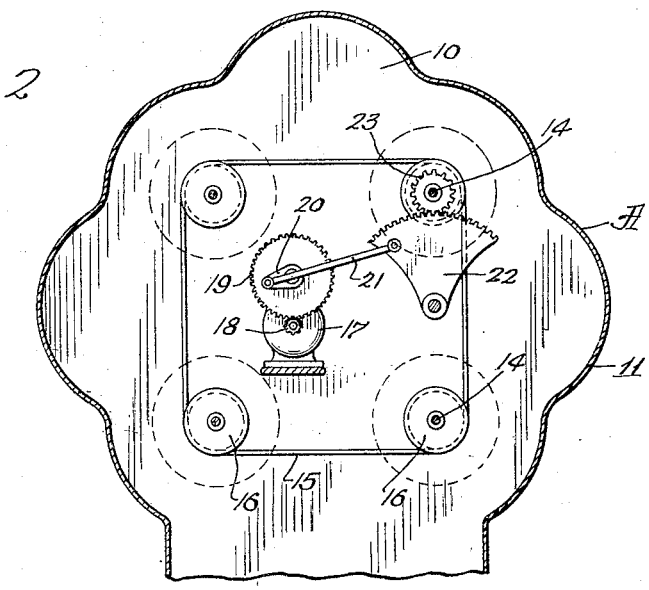

This and other objects, as will hereinafter appear, are accomplished by this invention, which is fully described in the following specification and shown in the accompanying drawing, in which, Figure 1 is a front elevation of an advertising device embodying the invention; and Fig. 2 is a partial vertical section through the same showing the operating mechanism.

The embodiment illustrated comprises a hollow box-like structure A adapted to be suitably supported, preferably in proximity to the building where the testing machines are located, so that it can be seen for considerable distances by people driving past the building.

The structure A includes two spaced parallel plates or sheets 10 separated by a peripheral spacer sheet 11, all of sheet metal or the like. On one or both faces of the sheets 10 are formed a plurality of dials 12, each preferably graduated in the same way. Pointers or hands 13 are mounted on shafts 14 which are journalled in suitable bearings (not shown) so as to oscillate over the dials. All shafts are geared together as by means of a chain 15 passing over sprockets 16, each keyed to one of the shafts so that the pointers can be set at the same angle after which they will all move in unison.

These shafts are driven as by means of an electric motor 17 through a suitable reduction gearing, such as a pinion 18 driving a gear 19, which in turn drives a crank 20 to which is connected one end of a connecting rod 21, the opposite end being connected to a pin on a gear segment 22 which is geared to a piston 23 on one of the shafts 14. Thus, the rotary motion of the gear 19 is transmitted by the connecting rod and gear segment as an oscillating movement to the shafts and pointers. All the pointers in consequence oscillate in unison, giving the suggestion of four dials of testing apparatus indicating a test of four elements, such as four automobile brakes, when made under dial conditions.

Space is provided on the sign for descriptive matter calling attention to the testing apparatus for the purpose described. Thus it will be seen that an advertising device is provided giving a visual representation of the operation of the mechanism advertised.

While I have shown and described but a single embodiment of my invention, it is to be understood that it is capable of many modifications. Changes, therefore, in the construction may be made which do not depart from the spirit and scope of the invention as disclosed in the appended claims.

I claim:

1. An advertising device comprising two boards, each having a plurality of dials, a shaft extending from each dial on one face to a dial on the other face, a pointer on each end of each shaft adapted to move over said dial, and means for moving said pointers in unison.

2. An advertising device having two spaced faces, each having a plurality of dials, a shaft extending from a dial on one face to a dial on the other face, a pointer on each end of each shaft movable over a portion of said dials, and means for moving said pointers in unison.

3. An advertising device comprising a board having four dials, a pointer for each dial, and a single means operatively connected to each pointer to oscillate all the pointers over the dials by substantially equal amounts and in the same direction.

FRED D. FISHER.